United States Patent

Huo

[15] 3,699,313
[45] Oct. 17, 1972

[54] SLIDE RULE WITH OPERATIONAL GUIDANCE AND DECIMAL POINT LOCATION MEANS

[72] Inventor: Wendell Y. Huo, 6112 North Damen Avenue, Chicago, Ill. 60645

[22] Filed: May 3, 1971

[21] Appl. No.: 139,770

Related U.S. Application Data

[63] Continuation-in-part of Ser. No. 802,830, Feb. 27, 1969, abandoned.

[52] U.S. Cl. .................. 235/64.3, 235/70, 235/84
[51] Int. Cl. ............................................. G06g 1/02
[58] Field of Search ............... 235/64.3, 69, 70, 84

[56] References Cited

UNITED STATES PATENTS 2,893,630  7/1959  Kamm ..................... 235/64.3
3,323,718  6/1967  Warner ..................... 235/64.3
3,374,947  3/1968  Wern et al. ............... 235/64.3

Primary Examiner—Richard B. Wilkinson
Assistant Examiner—Lawrence R. Franklin
Attorney—Rummler & Snow

[57] ABSTRACT

A logarithmic scale slide rule having means for readily determining operational direction and decimal location, comprising a system of oppositely facing brackets enclosing each 1 to 9.9999 scale range, and indicia symbols, whose first or second shape has one characterization to indicate the value "1" and another characterization to indicate the value of "0", said symbols being associated with certain of said brackets in such a manner as to indicate a plus or minus value whereby the sum of the values of said symbols encountered in the solution of a given problem will represent the power of 10, for the problem solution.

5 Claims, 6 Drawing Figures

INVENTOR
WENDELL Y. HUO

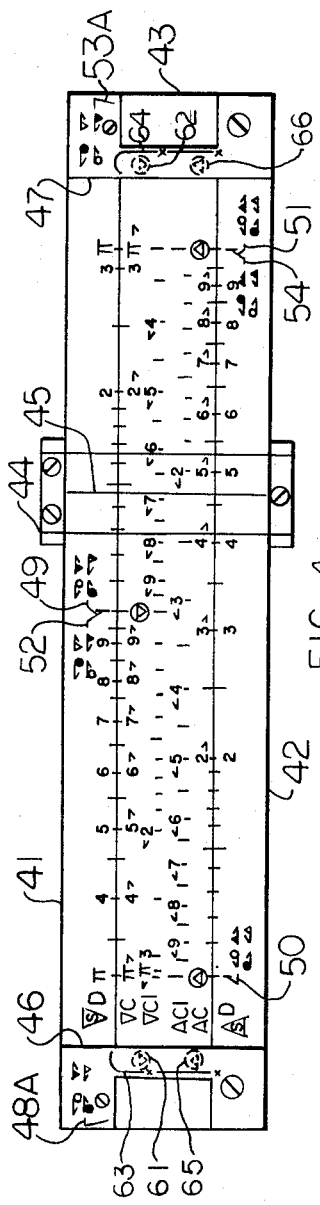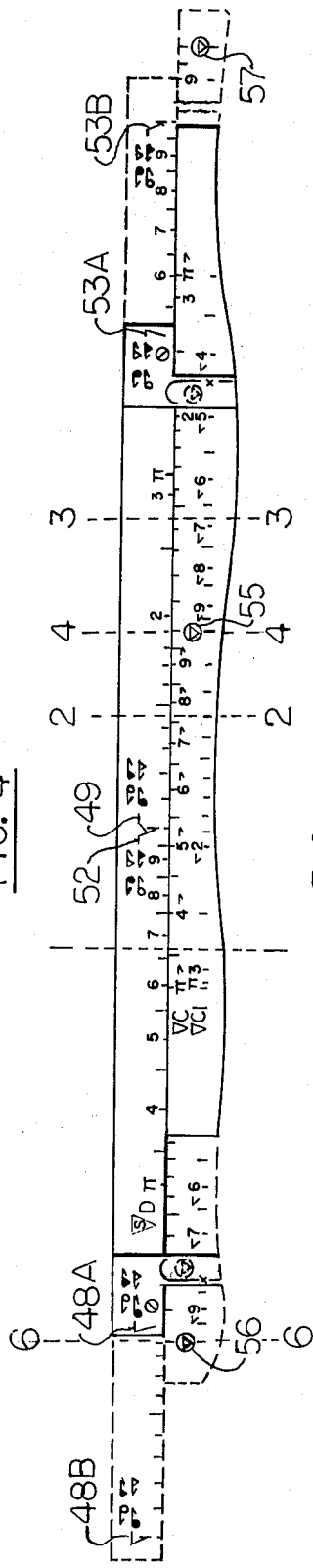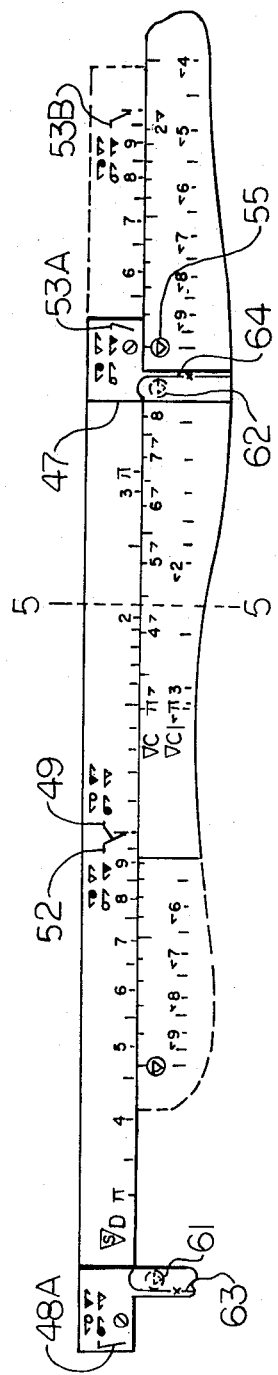
FIG. 4
FIG. 5
FIG. 6
INVENTOR
WENDELL Y. HUO

SLIDE RULE WITH OPERATIONAL GUIDANCE AND DECIMAL POINT LOCATION MEANS

This application is a continuation-in-part of my copending application Ser. No. 802,830, filed Feb. 27, 1969, now abandoned.

BACKGROUND OF THE INVENTION

The important features of a standard problem relative to slide rule operation are the upper and lower locations of known numbers and the operational sequences imposed upon them. The following are two standard problems:

$$X = (2\times3)/4 \qquad \text{Problem No. 1}$$

$$X = 2\times3\times4 \qquad \text{Problem No. 2}$$

In Problem No. 1, instead of calling 3 and 4 a multiplier and a divider, we call them a high and a low executor and call 2 an executed number. First executed number 2 is entered in a slide rule in the first or an odd numbered sequence, then the high executor 3 is set in the slide rule in the second or an even numbered sequence to multiply 2 to give a resultant which becomes the second executed number and the low executor 4 is set in the slide rule in the third or an add numbered sequence to divide the second executed number to give the final resultant of the problem. In Problem No. 2, there is only one level on the right side, but it is considered as a high level, so 2 is an executed number entered in an odd numbered sequence and 3 and 4 are high level executors entered respectively in an odd and even numbered sequence.

The important features of a slide rule are the variety of its logarithmic scales and its alternate hairline-intersecting and slide-moving steps operated on successive known numbers in a problem in accordance with their upper and lower level locations and odd and even sequences of operation. But the prior slide rules failed to designate the order of these slide rule operating steps or to guide the operator through the complicated scale systems, so he often made mistakes. Moreover, after completing operation of the slide rule, the operator still had to do some tedious calculation to get a decimal point properly located in the problem.

My present invention is to provide a means for guiding the slide rule users, throughout the complicated series of operations involved in the solution of a problem, with sign languages so as to avoid mistakes and to provide enough data so that the user can locate the decimal point by simple addition.

SUMMARY OF THE INVENTION

According to my slide rule, brackets, facing respectively in and against a scale direction, are printed at a main scale to divide it into ranges so that in each range the numerals, or readings, are continuously increasing in numerical value along one direction without interruption. Scale-marks are printed at numerals of each opposite or slider scale to distinguish it from the others by its reading direction and its upper or lower position on the slider. A main scale is a stationary body scale in which the first executed number is entered and the resultant is read; and an opposite scale is a slider scale in which an executor is entered.

A starting symbol, embodied in the name of a main scale, is composed of a starting sign and a shape of odd sequence, which directs the operation of the first executed number and keeps the sequence in said number. A boundary symbol, marked at each numeral 1 of each slider scale is a combination of two contrasting shapes of odd and even sequence which has a decimal value of zero and keeps the sequence in the executor "1". A bracket symbol, marked at the upper or lower level of any of said brackets is composed of a scale-mark and a shape of odd, or even, sequence, which directs the operation of an executor, other than "1", of same sequence and similar problem level on the opposite scale of similar scale-marks. And after the operation, if its bracket is now facing the hairline, its hollow shape indicates a decimal value of zero for that step, or its solid shape in high level indicates a decimal value of positive one, or its solid shape in low level indicates a decimal value of negative one. Thus my invention provides guidance to every number in a problem and decimal value for every step in which an executed number is multiplied or divided by an executor, so that the location of a decimal point in a problem can be easily obtained by simple addition.

BRIEF DESCRIPTION OF THE DRAWING

FIG. 4 shows a first group consisting of a folded main scale VD and folded opposite scales VC and VCI of different reading directions and another group consisting of a regular main scale AD and regular opposite scales AC and ACI of different reading directions. These two groups are of the same logarithmic lengths. Flat top arrow-heads are printed on scales VC and VCI to indicate their different reading directions and upper location; and flat bottom arrow-heads are printed on scales AC and ACI to show their different reading directions and lower location.

FIG. 5 is a fragmentary view of the slide rule shown in FIG. 4, showing only the folded scales which are assumed to be extended on both sides and the common numeral 1 (e.g. boundary symbol 55) of scales VC and VCI has been moved to the right side from its normal position but is still within the two end connector plates.

FIG. 6 is similar to FIG. 5 except that the common numeral 1 of scales VC and VCI has been moved outside of the right end connector plate.

DESCRIPTION OF THE PREFERRED EMBODIMENTS

The symbol elements and the symbols employed in the present disclosure and their intended meanings will be as shown in the following tables:

(See attached sheets showing Table 1 and Table 2.)

Figure 1:
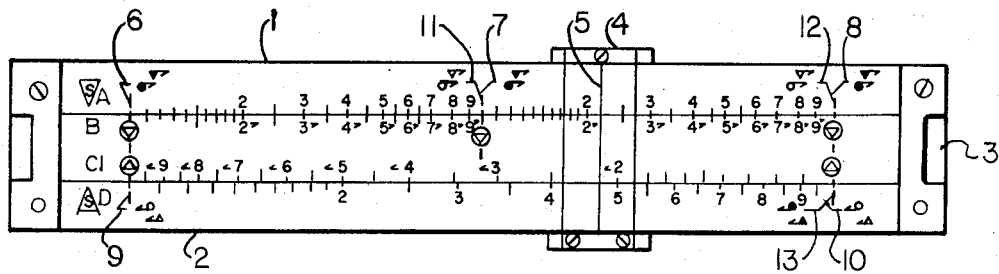
FIG. 1 shows a slide rule having a first group consisting of a conventional main scale VA and an opposite scale B and a second group consisting of a main scale AD and an opposite scale CI. In the first group, the two scales are of same reading direction and in the second group, the two scales are of different reading directions; and flat top and flat bottom arrow-heads are printed respectively in scales B and CI to indicate their reading directions and their upper and lower locations.

As shown in FIG. 1, the basic slide rule embodying my invention comprises the upper and lower bodies 1 and 2, a slider 3, and an indicator 4 having hairline 5. The slide rule is of conventional logarithmic type having an upper group consisting of main scale VA and opposite scale B of same reading direction and printed with 1st up scale-marks; and a lower group of main scale AD and opposite scale CI of opposite reading direction and printed with 2nd lo scale-marks. The two groups are of different logarithmic lengths and the name symbol of the upper main scale embodies an upper starting symbol and that of the lower main scale embodies a lower starting symbol. An upper boundary symbol is printed at each numeral 1 of slider scale B and a lower boundary symbol is printed at each numeral 1 of slider scale CI. First type brackets 6, 7, 8, 9 and 10 are printed at each numeral 1 of the main scales VA and AD so as to include each numeral 1; and second type brackets 11, 12 and 13 are printed at the second and third numeral 1 of scale VA and at the second numeral 1 of scale AD so as to include the reading 9.9999. The symbols on the arms of the first type brackets of scale VA are identical between brackets and those on the second type bracket arms of scale VA are also identical between brackets. The symbols at the first and second type brackets of scale AD are also identical between first type brackets and between second type brackets. These symbols are explained in Table 2.

Figure 2:
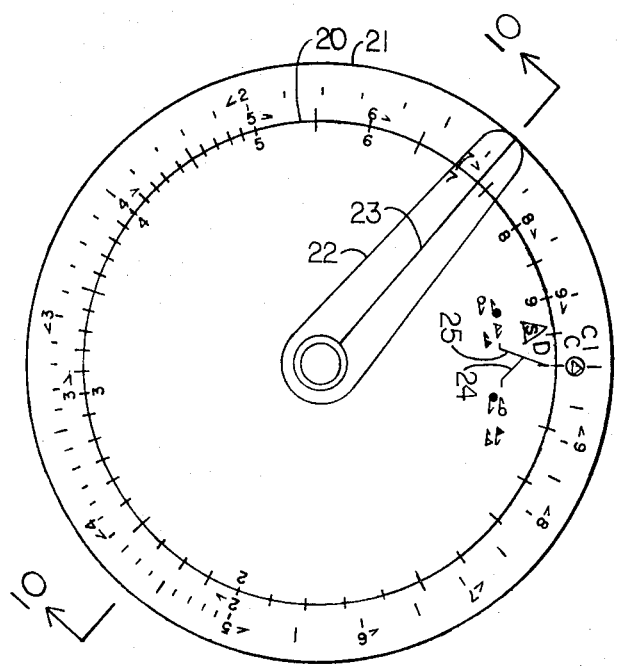
FIG. 2 shows a circular slide rule with a group of main scale AD and opposite scales C and CI of different reading directions; and arrow-heads are printed in scales C and CI to indicate their directions.
Figure 3:
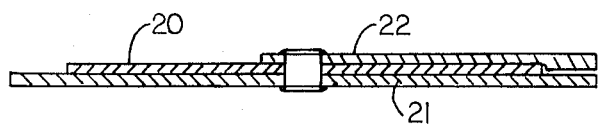
FIG. 3 is a sectional view as taken on line 10—10 of FIG. 2.

As shown in FIG. 2, the circular slide rule embodying my invention comprises stationary body 20, rotator 21 and indicator 22 having hairline 23. This slide rule has a main scale AD, opposite scale C marked with first *lo* scale-marks and another opposite scale CI marked with second *lo* scale-marks. The name sign of main scale AD embodies a lower starting symbol and a lower boundary symbol is marked at the common numeral 1 of scales C and CI. A first type bracket 24 and a second type bracket 25 are printed at numeral 1 of scale AD to include, respectively, said numeral 1 and the reading 9.9999. The symbols at the two brackets are explained in Table 2.

As shown in FIG. 4, the slide rule embodying my invention comprises upper and lower stationary bodies 41 and 42, slider 43, and indicator 44 having a hairline 45. Connector plates 46 and 47 connect the upper and lower stationary bodies in position. This slide rule has an upper folded group of main scale VD, a like opposite scale VC marked with first up scale-marks, and another opposite scale VCI marked with second up scale-marks; and a lower regular group comprising main scale AD, opposite scale AC marked with first *lo* scale-marks, and another opposite scale ACI, marked with second *lo* scale-marks. First type brackets 49, 50 and 51 are printed at each numeral 1 of scales VD and AD to include the said numeral and second type brackets 52 and 54 are respectively printed at the numeral 1 of scale VD and at the second numeral 1 of scale AD to include reading 9.9999. First type bracket 48A and a second type bracket 53A are printed at the left and right ends, respectively, of stationary body 41. The symbols are identical between each type of brackets of the same main scales and are explained in Table 2. 61 and 62 are the stand-by substitutes for the upper boundary symbol; 63 and 64 are the barrier lines; and 65 and 66 are the standby substitutes for a lower boundary symbol.

FIG. 5 shows the slider moved to one side and scales VD, VC and VCI hypothetically extended until they terminate a numeral 1 at both ends, and brackets 48B and 53B, respectively, replace 48A and 53A so that main scale VD is divided into a left range by brackets 48B and 52 and a right range by brackets 49 and 53B. To solve $X=6.6\times2.90$, we have line 1—1 representing the hairline position intersecting 6.6 at scale VD and 2.9 at scale VCI after 2.9 is moved with the slider to the hairline. Let line 6—6 intersect boundary symbol 56 so we can read the resultant 1.914 at scale VD under line 6—6. Since the resultant 1.914 is smaller than the executed number 6.60, that is the line 6—6 is behind hairline position 1—1, in the left range of scale VD, so the decimal value of this step would be a positive one so that $6.60\times2.90=19.14$ instead of 1.914. So we can read the decimal value of a positive one from the solid C— symbol in bracket 52 facing the hairline. It is obvious that the decimal value is for any similar step when the bracket 52 is facing line 1—1 and line 6—6 is behind line 1—1. That is, at the end of a step, in which either the hairline is moved to intersect a number or a number in a slider scale is moved to meet the hairline, we can always pick up a symbol to represent that step from the bracket facing the hairline and from its solid or hollow and upper or lower level, we can determine the decimal value of that step.

Referring again to FIG. 4, it will be seen that the upper group of scales VD, VC and VCI is divided into two bracketed areas, namely, the first area by bracket 48A at left and bracket 52 at right and the second area by bracket 49 at left and bracket 53A at right. The lower group of scales AD, AC and ACI is also divided into two bracketed areas, namely, the first area by bracket 50 at left and bracket 54 at right and the second area by bracket 51 at left and a boundary line 64 at the right.

To determine a facing bracket of a hairline position after the operation of a number look for the boundary symbol of the group of scales being used in the bracketed area containing the hairline, or its substitute on a connector plate if there is no boundary symbol in that area, and then looking across the hairline you note the first bracket in the main scale facing the hairline, which is the "facing bracket". For example, in FIG. 5, hairline position 1—1 is in the first bracketed area of the upper scales and because of no boundary symbol in that area, look from substitute boundary symbol 61 across the hairline to bracket 52 which is the facing bracket for hairline position 1—1. Since hairline positions 2—2 and 3—3 and boundary symbol 55 are all in one bracketed area, the second in FIG. 5, looking from boundary symbol 55 across the hairline 2—2 to the first bracket 49 facing the hairline, which is the facing bracket for hairline position 2—2, and likewise, looking from boundary symbol 55 across the hairline 3—3, see the first bracket 53A facing the hairline, which is the facing bracket for hairline position 3—3. Because, as shown in FIG. 5, the hairline position 4—4 is intersecting boundary symbol 55, the position 4—4 has no facing bracket. As shown in FIG. 6, the boundary symbol 55 has been moved beyond the second bracketed area of the upper scales, which contains hairline position 5—5. In such a case, a substitute boundary symbol 62 is used as reference for finding the facing bracket 49 for the hairline position 5—5.

A work model of my improved slide rule may be made from a commercial slide rule having scales DF, CF, CIF, D, C and CI by marking Scotch tapes with brackets, symbols and scale names as shown in the slide rule of FIG. 4 and pasting them in the positions as shown, except that to correlate with the conventional red color of the backward reading scales CIF and CI, the bracket symbols for those scales are made with backward arrows. Normally these red scale related symbols would also be printed in red color. The following illustrative operational procedures are based on this work model.

In a bracket on a main scale of the work model a symbol is to be taken to represent a number of similar level in a problem and a symbol in the other level is to be taken to represent the next number. These two numbers are called consecutive numbers, that is one of the consecutive numbers must be hairline-intersected and the other number must be slider-moved to the hairline. That a red or black triangular symbol represents a number means that the number would be hairline-intersected in a scale of the respective color and that a black or red round symbol represents a number means that the number is in a sliding scale of the respective color and is slider-moved to the hairline; and a number which is hairline-intersected or slider-moved to the hairline in a red or black scale is called a red or black number, respectively. In any bracket of the work model we can see that the two symbols of the same level are of different color, that is to say any two consecutive numbers in the same level in a problem are to be considered as of different colors. Also we can see that any two symbols of different levels and diagonally disposed relative to each other are of the same color, that is to say that any two consecutive numbers in different levels in a problem are of the same color. From this we derive a rule for two consecutive numbers.

The Rule of Two Consecutive Numbers

In a slide rule problem the action for the first number is to be hairline-intersected in a main scale and that number is to be called a black number. For any pair of consecutive numbers, if the action for the first number is to be hairline-intersected the action for the second number is to be slider-moved to the hairline, or if the first number is slider-moved to the hairline, the action for the second number is to be hairline-intersected. Also, any pair of consecutive numbers in the same level in a problem are to be considered as of different colors and if they are of different levels in the problem, they are to be taken as of the same color.

Therefore, considering the first and second numbers in a problem as two consecutive numbers and since the action and the color of the first number are known, i.e. black, according to the above rule the color and the action of the second number can be known and will be determined by the level of the second number in the problem. Accordingly, considering the second and third numbers in the problem as two consecutive numbers and the action and color of the third number can be known according to the problem level of the third number. Likewise, the action and the color of all successive numbers can be determined.

With the color or colors of the problem numbers known, the operator now, with reference to FIG. 4, has to decide whether the upper group of scales, black VD, black VC and red VCI, or the lower group of scales, black AD, black AC and red ACI, is to be used to enter the first and second numbers in a problem for operation. The first number is limited to entry into a stationary main scale, VD or AD, and the second number in the problem is limited to entry into one of the sliding scales, black VC, red VCI, black AC or red ACI. The operator can keep the next pair of consecutive numbers in the starting group of scales or switch them into another group of scales; but the two consecutive numbers, the first one of which is hairline-intersected and the second one is slider-moved, should be kept in the same group of scales. Therefore, having its color and action known, the operator can work a number without difficulty.

For example, for the problem $(20/10) \times (30/40) \times 50 \times 60 \times 70 \times 80 = X$, 10, 20, 30, 40 and 50 are black, being consecutive numbers in alternate levels of the problem, 60 is red since it follows black 50 in the same level, 70 is black and 80 is red since each follows an opposite color in the same problem level.

The triangular shape,  in the name of the upper main scale D, or  in the name of the lower main scale D, reminds the operator of hairline-intersecting of the first number in a problem on the relative main scale, that is, "S" is for start and the triangle is for an intersecting operation, so the combination of the two in the name of a main scale means to start the first number by intersecting it in the relative main scale; and the symbols in any bracket of my new slide rule represent the above rule. Therefore the system of symbols in my invention does not only give adequate information to locate a decimal point, but also serves to guide the whole operation of the slide rule.

For illustration, let us use the work model (FIG. 4) to work on the following problem, which preferably should be written as shown:

$$X = (34 \times 24 \times 74 \times 84 \times 94 \times 104)/(44 \times 11)$$

Application of the above rule: The operation is run from a number to another number in the following order: 34, 44, 24, 11, 74, 84, 94 and 104. The numbers 34, 44, 24, 11 and 74 are black since the first number 34 is a black number and any two consecutive numbers among these numbers are of different problem levels. The numbers 74, 84, 94 and 104 are all in the same problem level and since 74 is black, according to the consecutive number rule, 84 and 104 are red and 94 is black. Also, according to the rule, the odd sequence numbers 34, 24, 74 and 94 are to be hairline-intersected and the even sequence numbers 44, 11, 84 and 104 are slider-moved to the hairline. After operation of each number, if in the facing bracket the two symbols, one triangular and one round, whose color is similar to that of the operated number, are solid, jot down a check mark at that number, and if they are hollow, leave that number as it is.

Operation:

1. Hairline-intersect the first number, black 34, at lower black main scale AD.
2. Slider-move black 44 on lower black slider scale AC to the hairline; then sight from the lower right boundary symbol across the hairline to locate the lower first or left hand bracket as the facing bracket (50 in FIG. 4) whose two black symbols, representing black scales, are seen to be solid; and then jot down a check mark under 44.
3. Hairline-intersect black 24 on upper black slider scale VC and sight from the upper right boundary symbol substitute (62 in FIG. 4) across the hairline to locate the nearest upper bracket as the facing bracket (49 in FIG. 4) whose two black symbols are solid. Then make a check mark above 24.
4. Slider-move black 11 on upper black slider scale VC to the hairline and locate the upper fourth bracket (53A in FIG. 4) as the facing bracket whose two black symbols (with right hand scale direction arrows) are hollow to indicate a zero decimal value. In this case there will be no check mark for the number 11.
5. Hairline-intersect black 74 on upper black slider scale VC and locate the upper third or nearest bracket as the facing bracket whose two black symbols are solid. Then make a check mark above 74.
6. Slider-move red 84 on the upper red slider scale VCI to the hairline and locate the upper fourth bracket (53A in FIG. 4) as the facing bracket whose two red symbols representing the red scale VCI are solid; and then make a check mark above 84.
7. Hairline-intersect black 94 in the upper black slider scale VC and locate the upper second bracket (52 in FIG. 4) as the facing bracket whose two black symbols, with arrows pointing in the VC scale direction, are hollow to indicate zero decimal value, which requires no check mark for the number 94.
8. Finally, slider-move red 104 at red upper slider scale VCI to the hairline and locate the upper second bracket as the facing bracket whose two red symbols, with arrows pointing in the VCI scale direction, are solid. Now make a check mark above 104 and read the resultant number "1.025" on main scale VD opposite to the index "1" of slider scale VC.

After being marked with the check marks as above outlined, the problem will appear as follows:

$$X = \frac{\overset{\checkmark}{34} \times \overset{\checkmark}{24} \times \overset{\checkmark}{74} \times \overset{\checkmark}{84} \times 94 \times \overset{\checkmark}{104}}{\underset{\checkmark}{44} \times 11}$$

$$= 1.025 \times 10^{(11-3)} = 1.025 \times 10^8$$

The check mark in an upper level number means a decimal value of +1 and a mark in a low level number means a decimal value of −1. The number of check marks plus the number of digits more than one in each high level factor of the problem is 11; and the sum of the low level numbers and check marks is 3. The low level count is always of minus value while the upper level count is plus. Thus the power-of-ten for the decimal point location in the above problem will be 11 − 3 = 8 and $X = 1.025 \times 10^8$ or $X = 102,500,000.00$.

TABLE 1

ELEMENTS AND THEIR MEANINGS

| ELEMENT | MEANING | REMARKS |
|---|---|---|
| Starting sign S | denotes a starting scale. | |
| 1st up shape ▽ | intersecting a number on an upper scale with the hairline | See Note 1 |
| 1st lo shape △ | same as above except in a lower scale. | See note 1 |
| 2nd shape ○ | directs moving the slider to bring a number in its scale to meet the hairline in an even sequence. | See Note 1 |
| 1st up scale-mark → | a landmark for upper slider scale of forward direction. | |
| 1st lo scale-mark → | a landmark for lower slider scale of forward direction. | |
| 2nd up scale-mark ← | a landmark for upper slider scale of backward direction. | |
| 2nd lo scale-mark ← | a landmark for low slider scale of backward direction. | |

Note 1: A hollow shape means a decimal value of "0". A solid shape at the upper level of a bracket arm means a decimal value of +1, and a solid shape at lower level of a bracket arm means a decimal value of −1. A shape in first state means a hollow shape and a shape in second state means a solid shape.

TABLE 2

SYMBOLS AND THEIR MEANINGS

| SYMBOL AND LOCATION | MEANING |
|---|---|
| Name symbol ⚠D or ⚠A on an upper main scale | directs intersecting the first executed number on an upper main scale in odd sequence with the hairline. |
| Name symbol ⚠ on a lower main scale | same as above except on a lower main scale. |
| Boundary symbol ▽ at the numeral 1 of up-opposite scale | here '▽' means a hairline-intersecting step in which the numeral 1 is intersected by the hairline in an odd operation sequence and '○' means slider moving step in which the numeral 1 is moved with slider to meet hairline in an even sequence of operation. |
| Boundary symbol △ at the numeral 1 of lower opposite scale | same as above. |
| A-symbol ▽→ at the upper level of an upper scale bracket (see note 1) | the symbol for a multiplying hairline-intersecting step in which a high level executor is intersected by the hairline in the opposite scale of similar scale-marks in an odd sequence of operation. |
| B-symbol →▽ at the lower level of an upper scale bracket (see note 1) | same as above except that it directs a dividing step for a low level executor. |
| C-symbol →○ at the upper level of an upper scale bracket (see note 1) | directs a multiplying slider-moving step in which a high executor in an opposite scale of similar scale-marks is moved to meet the hairline in even sequence. |
| D-symbol ○→ at the lower level of an upper scale bracket (see note 1) | same as above except that it directs a dividing step for a low level executor. |
| E-symbol △→ at the upper level of lower scale bracket (see note 1) | a multiplying hairline-intersecting step in which high executor is intersected in opposite scale of similar scale-marks in odd sequence. |
| F-symbol →△ at the lower level of lower scale bracket (see note 1) | same as above except that it is a dividing step for low executor. |
| G-symbol →○ at the upper level of lower scale bracket (see note 1) | a multiplying slider-moving step in which high executor at the opposite scale of similar scale-marks is moved to meet hairline in even sequence. |
| H-symbol ○→ at the lower level of lower scale bracket (see note 1) | same as above except that it is a dividing step for low executor. |

I claim:
1. A slide rule comprising, a pair of relatively movable scale bearing members suitably secured together so that a scale extending along the edge of one member will be visibly related with a corresponding scale on the edge of the other member, a main, conventional, logarithmic scale extending over at least one order of magnitude and bounded by the index "1" extending along one edge of one of said members, a second scale corresponding to said main scale and extending in the same direction as said main scale extending along the edge of the other of said members, an indicator movable along said scales and extending transversely thereof, a first type bracket located adjacent each said index of said main scale with its bight facing the increasing scale direction and including the number "1", a second type bracket located adjacent each said index of said main scale with its bight facing the decreasing scale direction and including the number 9,999, a first type indicia positioned adjacent and within said bight of said first type bracket to indicate a decimal value of "1", and a second type indicia positioned adjacent and within the bight of said second type bracket to indicate a decimal value of "0".

2. A slide rule as in claim 1 wherein said scale bearing members consist of an upper and a lower part of an elongate stationary body, said parts being held in fixed relation with each other by front and rear connecting plates adjacent each end of the body, and a slider mounted between said parts and longitudinally adjustable with respect thereto, said main scale being located on one of said stationary body parts and said second scale being located on said slider, and said indicator consists of a hairline indicator movable lengthwise of said stationary body.

3. A slide rule as in claim 2 further extending
a third scale corresponding to said main scale and extending in the opposite direction of said main scale located on said slider,
third type indicia located adjacent said first type indicia to indicate a decimal value of "0",
and fourth type indicia located adjacent said second type indicia to indicate a decimal value of "1".

4. A slide rule as in claim 3 wherein each type indicia includes first and second marks, said first mark indicating a hairline operation and said second mark indicating a slider operation.

5. A slide rule as in claim 4 wherein said marks are vertically spaced.

* * * * *